Nov. 8, 1932.　　　P. KRAUSE　　　1,886,555
LIQUID METERING AND REGISTERING MECHANISM
Filed March 12, 1930
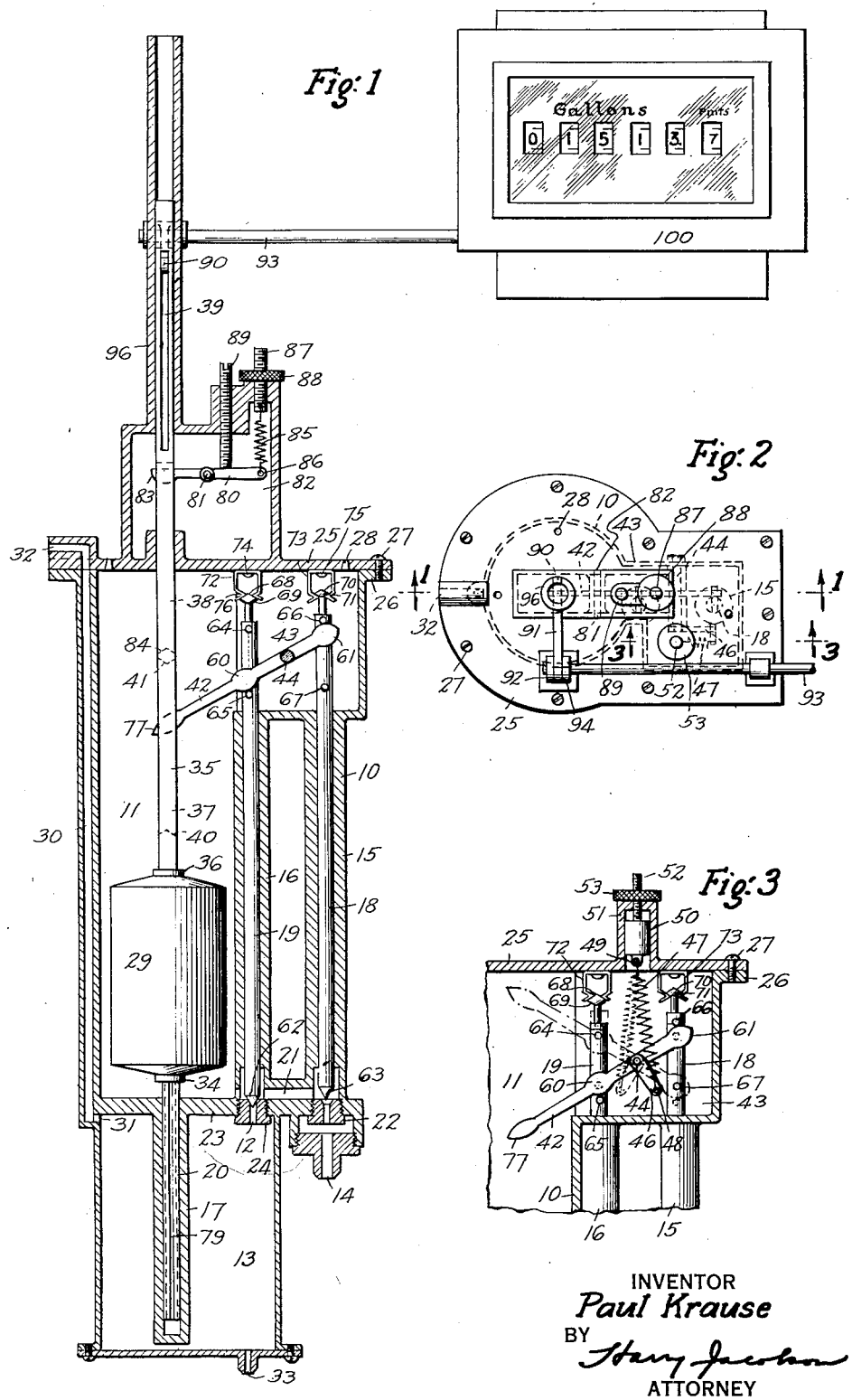
INVENTOR
*Paul Krause*
BY
ATTORNEY Patented Nov. 8, 1932

1,886,555

UNITED STATES PATENT OFFICE

PAUL KRAUSE, OF WEST BABYLON, LONG ISLAND, NEW YORK, ASSIGNOR OF ONE-THIRD TO HARRY TAYLOR AND ONE-THIRD TO RUDOLPH H. POSNER, BOTH OF WEST BABYLON, LONG ISLAND, NEW YORK

LIQUID METERING AND REGISTERING MECHANISM

Application filed March 12, 1930. Serial No. 435,062.

This invention relates to liquid metering apparatus and to apparatus for registering the quantity of liquid measured and fed thereby. The invention is particularly useful in connection with liquid feeding means for internal combustion engines such as automobiles and the like, where it is frequently advisable to register the quantity of fuel used by the engine. My invention, however, is not limited in its application to automobiles, but may be used in connection with various other types of liquid feeding and liquid utilizing devices for registering and controlling the quantity of any type of liquid fed for any desired purpose.

My invention contemplates the provision of simple and efficient means, readily adjustable to the type of liquid to be fed and designed to be interposed at any desired point in a liquid feed line for metering the liquid and registering the amount thereof passing through the apparatus.

The various objects of my invention will be clear from the description which follows, and from the drawings, in which Fig. 1 is a vertical section taken on the line 1—1 of Fig. 2, of a metering apparatus to which my invention has been applied, showing the apparatus connected to a register.

Fig. 2 is a top plan view of the metering apparatus.

Fig. 3 is a vertical section of the upper end thereof, taken on the line 3—3 of Fig. 2.

In that practical embodiment of my invention which I have illustrated by way of example and referring to Figs. 1 to 3 inclusive, the casing 10 is provided with a float chamber 11 and communicates through the outlet 12 to an auxiliary supply chamber as 13. Such a supply chamber is advantageous where a continuous supply of liquid to another device is desirable. It is to be understood, however, that where such a continuous supply is not necessary, the outlet 12 may serve as the outlet for the metering apparatus and may be connected directly to the supply line without the intermediary of the chamber 13, in which case the liquid supply will be more or less intermittent. The casing 10 is further provided with an inlet port 14 and guide sleeves 15, 16 and 17, respectively provided for the valve rods 18 and 19 and for the float rod 20. A passage as 21 communicates with the float chamber 11, inlet port 14 and the outlet port 12. Between the passage 21 and the inlet port 14 is provided the valve seat 22 integral with or suitably screwed or otherwise adjustably arranged in the bottom 23 of the casing. A similar valve seat 24 for the valve rod 19, and having the outlet port 12 therein communicating with the passage 21 is similarly arranged in the bottom of the casing. The casing may, if desired, be closed at its upper end by a suitable cover as 25, secured to the upper flange as 26 of the casing, as by means of the screws 27. Suitable perforations as 28 may be made in said cover to allow the entrance and egress of air during the movement of the float 29 in the float chamber. Similarly, to provide for the entrance and exit of air into and from the auxiliary chamber 13 without danger of leakage, an elongated air port as 30 may be provided on the casing, communicating near the bottom of the casing through the opening 31 with the supply chamber, and open near the top of the casing as at 32 to the atmosphere, whereby liquid may pass out of the float chamber through its outlet 33 under atmospheric pressure, if desired.

The float 29 may be in the form of a hermetically sealed hollow member of metal or other suitable material and is suitably secured at its lower end to the float guide rod 20 as at the connection 34. Said rod 20 is provided with flutes or longitudinal grooves 79 so that any liquid caught in the sleeve 17 may be discharged therefrom on the downward movement of the float. To the upper end of the float is secured the operating rod 35 as at the connection 36. Said rod 35 is provided with a series of vertically spaced slots as 37, 38 and 39. One of the slots is of the proper length and is suitably arranged to operate the valve rods 18 and 19 to open and close the ports 12 and 14 alternately through the intermediary of suitable interposed mechanism. Another of the slots operates the stop device, and the third is arranged to operate the registering mechanism in a manner soon to be described. The slot 37 is limited by its bottom wall 40 and its top wall 41. Between said walls and inserted into the slot is the valve lever 42 pivoted to one of the walls as 43 of the casing as by means of the pivot shaft 44. On said shaft is mounted the arm 46, projecting at substantially right angles to the lever 42 and pulled upwardly as by means of the spring 47 secured to one end of the arm as at 48, and secured at its other end as 49 to the spring tension adjusting plunger 50. As the lever 42 is oscillated by the float, the spring 47 becomes arranged first on one side of the arm and then on the other, alternately. The plunger 50 is mounted in a guide as 51 upstanding from the cover 25 and terminates in the adjusting screw 52. The tension on the spring 47 may be adjusted by raising or lowering the plunger 50.

This is done by turning the adjusting nut 53 mounted on top of the guide 51 and engaging the screw 52, said screw being prevented from rotating within the guide 51 by friction or by suitable means, which need not be shown.

The valve operating lever 42 is provided with suitable cam surfaces as 60 and 61 for operating the valve rods 19 and 18, respectively. Said valve rods terminate at their lower ends in suitably shaped valve portions 62 and 63, respectively, adapted to engage and close the valve seats on the valve members 24 and 22 respectively. Near their upper ends, each of the valve rods is provided with a pair of vertically spaced pins. The pins 64 and 65 on the rod 19 are adapted to be engaged by the cam surface 60 of the valve operating lever while the pins 66 and 67 are similarly adapted to be engaged by the cam surface 61. At their upper ends, each of the valve rods terminates in a double tapered portion. The valve rod 19 at its end is provided with an upwardly and inwardly tapering surface 68 and a downwardly and inwardly tapering surface 69 while the valve rod 18 is similarly provided with similarly tapering surfaces 70 and 71.

Spring members as 72 and 73 are secured to the underside of the cover 25 as by means of the screws 74 and 75 respectively. Each of said springs is provided with a pair of V sections 76 having the vertices thereof extending toward each other for the purpose of engaging the tapered ends of the valve rods to maintain said rods in the position into which they are moved by the lever 42 until moved therefrom by said lever, in a manner soon to be explained.

The operation of the valve mechanism is as follows:

Liquid being supplied to the inlet 14, as for example, from the gasoline tank of an automobile or from the vacuum tank thereof, or from any other suitable source of liquid supply, and the parts being in the position illustrated in Fig. 1 wherein the valve port 14 is opened by the valve rod 18 to communicate with the passage 21, and the valve end 62 of the rod 19 cuts off communication between said passage and the port 12, material entering the port 14 enters the passage 21 and flows about the valve rod 19 to enter the chamber 11. As the liquid accumulates in said chamber, buoyant pressure is exerted by the liquid upon the float 29, and after the pressure has reached the amount necessary to overcome the resistance of the mechanism, the float 29 begins to rise. At this time, the valve lever 42, being arranged in a predetermined position in the slot 37 between the ends 40 and 41 of said slot and dependent upon the quantity of liquid to be supplied on each reciprocation of the float 29, no movement of the lever occurs. As the float, however, continues to rise, the bottom 40 of the slot 37 engages the end 77 of the lever 42 and as the liquid puts further pressure upon the float to overcome the resistance of the springs 47 and 73 and the inertia of the mechanism, the valve lever 42 is swung together with the shaft 44 and the arm 46 about the axis of the shaft as a pivot, until the end 48 of the arm 46 passes the vertical line intersecting the axis of the shaft 44.

When this happens, that is, when the arm 46 passes its vertical or dead center position, the lower end of the spring 47 is carried past the dead center position and may then contract, thereby aiding to pull the arm 46 through the rest of its rotary movement into the position shown by the dotted lines of Fig. 3. It will be understood that the spring 47 tends to maintain the valve lever 42 in either of its limiting positions but due to its peculiar arrangement, it operates to resist the first part of the movement of said lever but operates to assist in the last part of said movement.

The various pins 64, 65, 66 and 67 are so arranged that they contact with the enlargements or cams 60 and 61 at the proper time to move the valve rods 18 and 19, respectively, simultaneously in opposite directions. For example, as the valve lever 42 is oscillated into the dotted line position of Fig. 3, the enlargement 61 leaves the pin 66 and contacts with the pin 67 while the enlargement 60 leaves the pin 65 and engages the pin 64. During the last part of the movement of the lever 42, the projection 61 is pushed downwardly upon the pin 67, thereby disengaging the tapered end 70 of the valve rod from the V sections 76 of the spring 73, and forcing the valve rod 18 downwardly so that the end 63 thereof seats upon the valve seat 22 therefor and closes the port 14. At about the same time, the projection 60, acting upon the pin 64, raises the valve rod 19 and forces the tapered end 68 thereof past the V sections 76 of the spring 72 into position wherein the valve rod end 62 is lifted from its seat and thereby opens the port 12 into communication with the float chamber 11. The rod 18 is held in its uppermost position by reason of the contraction of the V sections 76 underneath the tapered head 70 while the valve rod 19 is similarly held in its lowermost position by the pressure exerted upon the uppermost surface of the tapered end 68 thereof by the V sections 76.

As the port 12 is opened by the movement just described and the port 14 closed, no additional liquid can enter the chamber 11 but the liquid contained in said chamber is discharged into the auxiliary chamber 13 through the port 12. As said liquid is discharged from the float chamber, the float 29 drops, allowing the upper end 41 of the slot 37 to engage the end 77 of the valve lever 42 to reverse the operation just described, that is, to lower the valve member 19, to close the port 12 and simultaneously to lift the valve rod 18 to open the port 14 whereupon the operation may be repeated.

It will be understood that the tension upon the spring 47 may be regulated and adjusted so as to provide for a definite predetermined amount of liquid entering the float chamber 11 before the valve rods 18 and 19 can be operated. This is done merely by turning the nut 53 in the proper direction to raise or lower the screw 52 and thereby, to raise or lower the plunger 50 correspondingly and to lengthen or shorten the spring 47 as may be required to regulate the quantity of liquid entering into and discharged from the float chamber 11 on each reciprocation of the float 29. It will be understood that as the float 29 rises, the air in the chamber 11 may be expelled through the openings 28 by the liquid entering the chamber and similarly, air may be admitted into the float chamber 11 through said openings as the liquid is discharged.

It will also be understood that the outlet 33 of the auxiliary chamber 13 may be connected to any apparatus which it is desired to supply with liquid as for example, the carburetor of an automobile. As the liquid is discharged through the port 33 from the chamber 13, air is drawn into said chamber through the openings 30 and 31. Similarly, air is forced out through said openings 30 and 31 as the liquid passes through the float chamber 11 into the auxiliary chamber. It will further be understood that the float rod 20 may be fluted as by means of the longitudinally arranged slots 79 to allow any liquid which has entered the opening in the sleeve guide 17 to be discharged therefrom through said slots as the float 29 descends.

I prefer to provide an additional means for controlling and adjusting the precise quantity of liquid discharged through the port 12 at each reciprocation of the float 29.

Such an adjustment is desirable for purposes of accuracy and to compensate for variations in the size, weight and liquid pressure put upon the float and for adjusting the apparatus to feed liquids of different specific gravities, other than the adjustment possible in the variation of the height or position of the top and bottom of the slot 37.

The adjustment about to be described is designed to offer varying resistance to the rise of the float 29, so that near the later part of its movement, the buoyant effect of the liquid upon the float is partly counteracted to an extent which may be accurately adjusted. The height of the liquid necessary to exert the required buoyant pressure upon the float to overcome the adjustable resistance may therefore be accurately determined so that the volume of liquid entering the float chamber may thereby be adjusted to the desired accuracy. The means I have employed for the purposes just described consist of a resistance lever 80 pivoted as at 81 to the wall 82 upstanding from the cover 25. The end 83 of the lever is inserted into the slot 38, which is made of such length that the top of the slot does not contact with said lever end 83 when the float 29 is in its lowermost position. The bottom 84 of the slot 38, however, is designed to engage the lever end 83 at about the same time that the bottom 40 of the slot 37 engages the valve lever end 77. One end of a suitable spring as 85 is attached to the end 86 of the lever 80 while the other end of said spring is attached to a non-rotatable adjusting screw as 87 mounted similarly and acting similarly to the screw 52. The nut 88 engages the screw 87 and upon its rotation, is designed to raise and lower said screw, and thereby to lengthen or shorten the spring 85 and to adjust the effective tension thereof upon the resistance lever.

The normal position of the end 83 of said lever may be accurately adjusted as by means of the adjusting screw 89, mounted in the casing 82 and engaging the lever 80 on one side of its pivot 81. By its engagement with the upper end wall of the slot 38, the lever 80 may limit the lowermost position of the float. As the float rises, and the bottom 40 of the slot 37 begins to exert pressure upon the valve lever 42 to throw said lever, the bottom 84 of the slot 38 engages the end 83 of the resistance lever whereupon further upward movement of the float 29 is resisted until a sufficient additional quantity of liquid enters the float chamber 11 to overcome the resistance of the spring 85. When the liquid rises to the predetermined height to effect this purpose, the valve lever 42 is quickly thrown and the resistance lever 80 is also swung about its pivot, allowing the valve rods 18 and 19 to be operated by the float.

On the descent of the float, the lever 80 is released and rests against the end of the stop screw 89 under the influence of the spring 85. As has been indicated, the lever 80 may be so adjusted and the length of the slot 38 may be such that downward movement of the float past a predetermined position and just before the valve 12 is closed, may be prevented by the engagement of the lever with the upper end wall of the slot 38.

It will be noted from the above that on each complete reciprocation of the float 29, a predetermined quantity of liquid is discharged through the port 12. The reciprocations of the float and of the rod 35 therefor may be measured by a suitable registering device properly graduated so as to determine, totalize and register the quantity of liquid fed through the apparatus. Toward this end, I prefer to connect the float rod 35 to a suitable registering and totalizing mechanism. In the slot 39 at the upper end of the float rod 35, which slot is preferably arranged in a plane of substantially right angles to that of the slots 37 and 38, I arrange one end 90 of the lever 91. The other end 92 of said lever is mounted upon the shaft 93 so that oscillation of the end 90 serves to oscillate said shaft. The shaft 93 is supported in a suitable bearing as 94 upstanding from the cover 25 or otherwise supported. A guide sleeve 96 projects upwardly from the wall 82 and serves to guide the float accurately in its movement.

The shaft 93 is suitably secured to the shaft of the register 100 for operating the registering mechanism thereof.

It will be seen that I have provided simple and effective mechanism adapted to be interposed in any liquid feed line for predetermining the quantity of liquid to be fed at a time, and for metering said liquid. As one example of an application of my improved metering device, it may be inserted into the fuel line of an automobile to measure the quantity of gasoline consumed by the engine, and other numerous obvious applications thereof need not be mentioned.

While I have shown and described certain specific applications of my invention and embodiments thereof, I do not wish to be understood as intending to limit myself thereto as I intend to claim my invention as broadly as may be permitted by the state of the prior art and the terms of the appended claims.

I claim:

1. In a liquid metering mechanism, a casing having a float chamber and inlet and outlet openings for liquid communication with the chamber, valve rods for opening and closing said openings to admit and to discharge liquid alternately into and from the chamber through the openings, a float in the chamber, a guide rod depending from the float, a second slotted guide rod upstanding from the float, means engaging the guide rods to guide the float, a lever loosely inserted into a slot of the slotted rod and rocked by the end walls of said slot, means for operatively connecting the lever to the valve rods for operating the valve rods to open the outlet when the float is in its highest position and to simultaneously close the inlet, and for reversing the position of the valve rods near the lowermost position of the float, and means for maintaining the rods in the position into which they are moved until moved therefrom by said lever.

2. In a liquid metering mechanism, a casing having an inlet and an outlet adjacent each other at the bottom of the casing, a float, a rod secured to said float and having a plurality of spaced slots therein, a pair of similar valves, one for the inlet and the other for the outlet, a lever loosely inserted into one of the slots of the rod for operating said valves in opposite directions alternately to alternately admit and discharge liquid into and from said mechanism, means inserted into another of said slots for limiting the movement of the float, and a lever loosely inserted into another slot of the rod and adapted to operate a registering mechanism.

3. In a liquid metering mechanism, a casing, an auxiliary chamber on said casing, said casing having a discharge opening communicating with said auxiliary chamber and having an inlet opening, a valve rod for each of said openings, a float in the casing, a rod upstanding from said float projecting through the top of said casing and having a plurality of spaced slots therein, a lever pivoted to said casing and arranged with one end thereof entering the lowermost slot of said rod, a pair of spaced pins on each of said valve rods adapted to engage said lever, an end portion on each of said valve rods tapered upwardly and tapered downwardly below the upwardly tapered part, springs for engaging each of said tapered ends to maintain one of said valve rods in open position and the other of said valve rods in closed position and vice versa when said rods are moved into said positions, said lever actuating said valve rods alternately in opposite directions on the rise and descent of said float, and means entering another of the slots of said rod for limiting the movement of the float.

4. In a liquid metering mechanism, a casing having an inlet opening and an outlet opening, in the bottom thereof, an independent valve rod for each of said openings, a float in said casing, an upright slotted rod secured to the float, means for operatively connecting the slotted rod to the valve rods for actuating said rods simultaneously in opposite directions, comprising a lever pivoted at a point between the valve rods and having one end thereof inserted in a slot of the slotted rod, and spaced pins on the valve rods arranged to be engaged by the lever, and spring means for maintaining the rods in the position into which they are moved by said actuating means until positively moved therefrom.

5. In a liquid metering mechanism wherein liquid is alternately admitted and discharged, a float movable under the action thereon of said liquid, a lever, means operatively connecting the lever to said float, a pair of valve rods arranged on opposite sides of the pivot of said lever, a pair of vertically spaced pins on each of said rods, the upper pin of one rod and the lower pin of the other rod being arranged to be engaged by said lever on the movement of the float in one direction to operate said rods in opposite directions, and the other pins of the rods being arranged to be engaged by said lever on the movement of the float in the other direction to move said rods in directions opposite to those in which they have been first moved, and a spring arranged coaxially of and above the upper end of each of the rods for engaging said end and for maintaining the rod in the position into which it is moved by the lever until the rod is positively moved therefrom.

6. In a liquid metering mechanism, a float, a casing having an inlet and an outlet, an upright rod having a plurality of vertically spaced slots therein secured to the float, a rod for the inlet, a similar rod for the outlet, adjustable means for limiting the movement of said float in either direction to permit the entry and discharge of a predetermined quantity of liquid into and from said casing, said means comprising a lever having an end inserted into a slot of the slotted rod, an adjustable tension spring at its other end, a pivot between said ends, and an adjustable stop for the lever, and means operatively connected to the upright slotted rod for operating said inlet and outlet rods simultaneously in opposite directions whereby liquid is admitted to said casing in the lowermost limiting position of said float, and liquid is discharged from said casing when the float reaches its uppermost position, said last-mentioned means comprising a single lever pivoted at a point between the inlet and outlet rods and having one end inserted into a slot of the slotted rod, and pins on the inlet and outlet rods engageable by portions of the lever on opposite sides of the pivot thereof.

7. In a liquid metering mechanism, a casing having an inlet and an outlet opening therein, a valve rod for each of said openings, a float in the casing moved by the liquid entering therein through the inlet opening, adjustable spring stop means operatively connected to said float for resisting the final part of the upward movement of the float and limiting the movement thereof in either direction, and means operatively connecting the float to said valve rods to operate said valve rods simultaneously in opposite directions to close one of said openings on the opening of the other.

8. In a liquid metering mechanism, a pair of valve rods, a lever, a pivot for said lever arranged between said rods, an arm on said pivot arranged with its axis substantially at right angles to the axis of said lever, a tension spring secured to one end of said arm and movable from one side to the other side of the arm, means at the other end of said spring for adjusting the tension on said spring and a pair of vertically spaced pins on each of the rods, the pins of each pair being arranged on opposite sides of the lever, for operatively connecting said rods to the lever and for actuating the rods simultaneously in opposite directions on the movement of the lever in one direction.

9. In a liquid metering mechanism, a casing having an inlet opening and an outlet opening therein, a reciprocatory valve for each of said openings, a float in said casing, a rod secured to and upstanding from the float and having vertically spaced slots therein, a valve-operating lever arranged to be oscillated by the rod when the float approaches its limiting positions, one end of the lever being loosely inserted into one of the slots of said rod, a resistance lever having one of its ends loosely inserted into another slot of the rod, a spring for normally urging said inserted end of the resistance lever downwardly to resist the last part of the upward movement of said float, means for adjusting the tension of said spring, an adjustable stop for normally positioning said resistance lever to determine the lowermost position of the float, a pair of projections on each of the valves, the projections of each pair being vertically spaced apart a distance greater than the width of the valve operating lever for operatively connecting the operating lever to the valves and for moving said valves in opposite directions to open one of said openings and to close the other when said float reaches either of its limiting positions, said operating lever extending in between the projections of each pair on each valve, and means for normally maintaining the valves in the positions in which they are set by said operating lever.

10. In a liquid metering mechanism, a movable float, valve means, means actuated by said float to operate the valve means to admit liquid into said mechanism in the lowermost position of said float and during upward movement of the float and to prevent discharge of liquid therefrom during the same movement, and to discharge liquid from said mechanism after the float has reached its uppermost position and to prevent entry of liquid therein during the discharge, and means yieldable in one direction for limiting the movement of said float in either direction and for resisting the final part of the upward movement of the float.

11. In a liquid metering mechanism, a float movable upwardly by the pressure of liquid admitted into said mechanism, means for controlling the admission and discharge of liquid into and from said mechanism, means for operatively connecting said controlling means to the float, and adjustable means yieldable in one direction for adjusting the vertical pressure put upon the float by said liquid during the final part of the movement of the float, and thereby determining the quantity of liquid necessary to operate said controlling means, said yieldable means serving to limit the downward movement of the float.

12. In a liquid metering mechanism, a float adapted to be raised and lowered by the liquid entering and leaving said mechanism, means yieldable in one direction for resisting the movement of the float under the influence of entering liquid as the float nears its uppermost position, said means comprising a lever, means for operatively connecting the lever to the float, a spring acting on the lever and an adjustable stop for the lever, means for controlling the admission and discharge of liquid, and means for operatively connecting said lever to the controlling means.

13. In a liquid metering mechanism, a movable float, and adjustable means for resisting the movement of said float near at least one limiting position, comprising a lever operatively connectable to said float in said positions of the float, a spring for resisting movement of the lever in one direction, an adjustable stop for preventing movement of the lever when the float is in one of its limiting positions, and means for adjusting the tension of said spring.

14. In a liquid metering mechanism, a casing having an inlet and an outlet in the bottom thereof, a float movable vertically in said casing under the influence of liquid entering and leaving said casing, valves controlling the admission and discharge of liquid into and from said casing, and means for operatively connecting the float to the valves comprising an oscillatory lever pivoted between its ends at a point between said valves and operatively connected to and oscillated by said float when the float approaches its uppermost and lowermost positions, a member extending from the pivot of said lever in a direction at substantially right angles to the axis of said lever and on one side thereof, a spring secured to said member at one end and having the other end thereof fixed at a point on the opposite side of said lever and adapted to move from one side to the other side of the pivotal axis of the member on the oscillation of the lever, whereby the lever is normally maintained by said spring against movement, means for adjusting the tension of said spring, and means on said valves for operatively connecting the valves to the lever for simultaneously operating the valves on the oscillation of the lever into its extreme positions.

15. In a liquid metering mechanism, a casing having a float chamber therein and provided with inlet and outlet openings communicating with the float chamber, a float movable vertically in the chamber under the influence of liquid admitted into and discharged from the chamber, an upper rod secured to and projecting upwardly from the float, said rod having three vertically spaced slots therein, a lower rod secured to and depending from the float, the surface of the lower rod being fluted, a guide sleeve surrounding the lower rod, a similar sleeve for the upper rod, a valve rod for each of said openings, the valve rods being of slightly less height than that of the float chamber and being parallel to the upper and lower rods, a lever of sufficient length to extend from the upper rod to the inlet valve rod, a pivot for the lever arranged between the valve rods, one end of said lever being arranged in the lowermost slot of the upper rod, an upper pin near the upper end of each of the valve rods, a lower pin on each of the valve rods spaced from the upper pin a distance less than the length of said lowermost slot and greater than the width of the lever, said pins being arranged in the path of the lever, a tapered upper end on each of the valve rods, a sheet spring on the casing above each of the valve rods, indented V shaped portions on each of the springs for engaging the tapered end of each of the valve rods and for normally retaining said valve rods yieldably against movement, a spring having one movable end operatively connected to the lever, means secured to the other end of the spring for adjusting the spring, the movable end of said spring being movable by said lever from one side of said pivot to the other side for normally and yieldably maintaining the lever in the position in which it is swung by the ends of said lowermost slot, a second lever having its end inserted into the intermediate slot of the upper rod, a pivot for said lever arranged beyond the rod, an adjusting screw beyond the pivot adapted to engage the lever for maintaining said lever against movement in one direction while permitting movement in the other direction, an adjustable spring for the other end of the lever, a third lever having one end inserted into the uppermost slot of the upper rod, and a shaft for pivotally supporting said third lever, said shaft being oscillated on the upward and downward movement of the float.

16. In a liquid metering mechanism, a vertically movable float, an upper guide rod secured to the float, a sleeve surrounding said rod for guiding said rod, a lower guide rod secured to and depending from the float, said lower rod being longitudinally fluted and thereby providing a longitudinal passage for liquid in the outer surface of the rod, and a sleeve closed at one end surrounding the lower rod for guiding said rod, whereby the float is guided in its vertical movement, and liquid in said last-mentioned sleeve is expelled through the fluted portion of the lower rod when said lower rod enters said sleeve.

17. In a liquid metering mechanism, a casing having a float chamber therein and provided with inlet and outlet openings communicating with the float chamber, a float movable vertically in the chamber under the influence of liquid admitted into and discharged from the chamber, a rod secured to and projecting upwardly from the float, said rod having vertically spaced slots therethrough, a guide for said rod, an independent valve rod for each of said openings, of slightly less height than that of the chamber, a lever, a pivot for the lever arranged between the valve rods, one end of said lever being arranged in one of the slots of the slotted rod, a pair of pins projecting from each of the valve rods into the path of the lever, the pins of each pair being spaced apart vertically a distance greater than the width of the lever, spring means for engaging the upper end of each of the valve rods for maintaining the valve rods normally against displacement, and spring means for normally maintaining the lever against displacement.

PAUL KRAUSE.